US006735703B1

(12) United States Patent
Kilpatrick et al.

(10) Patent No.: US 6,735,703 B1
(45) Date of Patent: May 11, 2004

(54) MULTI-PLATFORM SEQUENCE-BASED ANOMALY DETECTION WRAPPER

(75) Inventors: Douglas Kilpatrick, Herndon, VA (US); Mark Lee Badger, Rockville, MD (US); Calvin Ko, San Jose, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/566,378

(22) Filed: May 8, 2000

(51) Int. Cl.[7] .............................................. G06F 17/00
(52) U.S. Cl. ........................ 713/201; 713/151; 713/152
(58) Field of Search ................................ 713/150–154, 713/162–167; 380/35–37; 213/200–202

(56) References Cited

U.S. PATENT DOCUMENTS 6,684,329 B1 * 1/2004 Epstein et al. ............... 713/150
6,687,831 B1 * 2/2004 Albaugh et al. ............. 713/201
6,687,833 B1 * 2/2004 Osborne et al. ............. 713/201

OTHER PUBLICATIONS www.sdl.sri.com/projects/saw/overview.html.*
Michem et al., Linux kernal loadable wrappers, DARPA Informationi Surivivability Conference and Exposition, 2000, DISCEX '00, Proceedings, vol. 2, Jan. 25–27, 2000, pp. 296–307, vol. 2.*
Badger, Information security: from reference monitors to wrapopers, Aerospace and Electronic Systems Magazine, IEEE, vol. 13, Issue 3, Mar. 1998, pp. 32–33.*
Sewell et al., Secure composition of untrusted code: wrappers and causality types, Computer Security Foundations Workshop, 2000, CSFW-13, Proceedings, 13th IEEE, Jul. 3–5, 2000, pp. 269–284.*

"Detecting Intrusions Using System Calls: Alternative Data Models" Christina Warrender et al., *1999 IEEE Symposium on Security and Privacy, IEEE Computer Society* pp. 133–145.
"Intrusion Detection Using Sequences of System Calls", Steven A. Hofmeyr et al., Department of Computer Science, University of New Mexico, pp. 1–34, and Revisions Made to the Paper (7) pages, Dec. 17, 1997.
"Intrusion Detection Using Sequences of System Calls", Steven A. Hofmeyr et al., Department of Computer Science, University of New Mexico, pp. 1–25, Aug. 18, 1998.
"Hardening COTS Software with Generic Software Wrappers" Timothy Fraser et al., *1999 IEEE Symposium on Security and Privacy*, (15) pages.
"Distance Between Strings", www.cut–the–knot.com/do__you__know/Strings.html, pp. 1–2, printed Feb. 29, 2000.
"Alignments, the Basis for Sequence Comparison"http://rrna/uia.ac.be/~peter/doctoraat/ali/html, pp. 1–7, printed Mar. 22, 2000.
D. Kilpatrick and L. Badger, "Sequence–Based Intrusion Detection Using Generic Software Wrappers," 1999 IEEE Symposium on Security and Privacy, May 9–12, 1999 (with abstract and program schedule).

* cited by examiner

*Primary Examiner*—David Jung
(74) *Attorney, Agent, or Firm*—Silicon Valley IP Group, PC; Kevin J. Zilka; Christopher J. Hamaty (57) ABSTRACT

A real-time sequence-based anomaly detection system is disclosed. In a preferred embodiment, the intrusion detection system is incorporated as part of a software wrapper. Event abstraction in the software wrapper enables the intrusion detection system to apply generically across various computing platforms. Real-time anomaly detection is enabled through the definition of a distance matrix that defines allowable separation distances between pairs of system calls. The distance matrix indirectly specifies known sequences of system calls and can be used to determine whether a sequence of system calls in an event window represents an anomaly. Anomalies that are detected are further analyzed through levenshtein distance calculations that also rely on the contents of the distance matrix.

12 Claims, 4 Drawing Sheets

MULTI-PLATFORM SEQUENCE-BASED ANOMALY DETECTION WRAPPER

The invention was made with Government support under Contract F30602-96-C-0333 awarded by the Air Force. The Government has certain rights in this invention.

BACKGROUND

1. Field of the Invention

The present invention relates generally to intrusion detection, and more particularly, to systems and methods for implementing real-time sequence-based anomaly detection.

2. Discussion of the Related Art

An organization's network security plan typically includes various lines of defense. Firewall systems represent a common first line of defense. Firewalls generally represent a security enforcement point that separates a trusted network from an untrusted network. In operation, firewalls screen all connections by determining which traffic should be allowed and which traffic should be disallowed based on a predetermined security policy.

Inevitably, this first line of defense will fail. The second line of defense of the network security plan is intrusion detection. After an intruder has successfully penetrated the perimeter and gained access to systems within the protected network, a mechanism must exist to quickly detect the intruder and minimize the damage that the intruder can inflict.

Intrusion detection is based on the general assumption that the behavior of the intruder differs from that of a legitimate user in ways that can be quantified. The variance between the respective behaviors will presumably increase where the intruder is operating in a manner calculated to produce increasingly malicious results. In general, the characterizations of the typical behavior of authorized users as compared to the characterizations of the behavior of intruders will not be mutually exclusive. It is therefore a goal of intrusion detection system designers to minimize so called "false positives," i.e., characterizations of legitimate behavior as that of an intruder.

Intrusion detection systems that monitor for intrusive behavior need to collect data on the dynamic state of the system. Various types of dynamic state information can be collected. For example, some intrusion detection systems collect profiles of user behavior that are generated by audit logs. Other systems look at network traffic or attempt to characterize the behavior of privileged processes.

Once a behavioral characteristic is selected, it is used to classify data. Classification techniques can be divided into two categories. A first category is represented by techniques that look for known intrusion signatures. This category of techniques, known as misuse intrusion detection techniques, encodes intrusion signatures or scenarios and scans for occurrences of those signatures. Accordingly, these techniques require prior knowledge of the nature of the intrusion. In one example, misuse intrusion detection systems use an expert system to fit data to known intrusion signatures.

A second category of classification techniques is represented by those techniques that look for anomalous behavior. In anomaly intrusion detection, it is assumed that the nature of the intrusion is unknown, but that the intrusion will result in behavior different from that normally seen in the system. Anomaly intrusion detection systems use models of normal or expected behavior to monitor systems. These models form the basis of the determination of whether observed behavior deviates substantially from what is expected.

One example of an anomaly intrusion detection system is described in S. A. Hofmeyr, S. Forrest, A. Somayaji, "Intrusion Detection Using Sequences of System Calls," Journal of Computer Security, 6:151–180, 1998, which is incorporated herein by reference in its entirety. In the Hofmeyr approach, a program is viewed as a black box, and therefore no specialized knowledge of the internal functioning of the program is required. The internal functioning of the program is inferred indirectly through the observation of the program's normal behavior.

The behavior of the program is observed through the monitoring of system calls that access system resources. In the Hofmeyr system, short sequences of system calls were assumed to represent a good simple discriminator for several types of intrusions. Accordingly, in a first stage, profiles of observed sequences of system calls that occur in the conventional and acceptable operation of the program are recorded. These stored profiles form the basis by which the intrusion detection system can determine whether the system calls of a monitored process conform to the profiles of expected behavior. Deviations from the stored profiles would indicate an anomalous operation of the program.

To generate a database of profiles, the stream of system calls generated by a particular program is traced to identify all unique sequences of a given length, k, that occurred during the trace. Each program of interest has a different database that is specific to a particular architecture, software version and configuration, local administrative policies, and usage patterns. The following example illustrates the construction of a database.

Suppose the system observes the following trace of system calls (excluding parameters):

open, read, mmap, mmap, open, read, mmap

A window of size k is moved across the trace, recording each unique sequence of length k that is encountered. For example, if k=3, then the following unique sequences result:

open, read, mmap read, mmap, mmap mmap, mmap, open mmap, open, read

Figure 1:
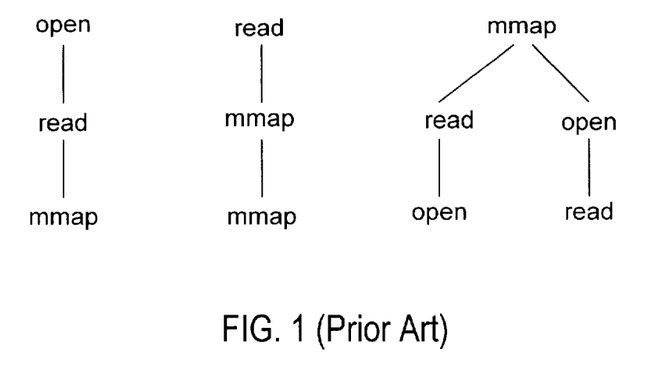
FIG. 1 illustrates examples of a conventional mechanism for storing system call sequences

Hofmeyr stores these sequences as trees, with each tree rooted at a particular system call. The set of trees corresponding to the above example is illustrated in FIG. 1. As illustrated, each system call tree is rooted at the first system call in the sequence. For example, the open-read-mmap tree is rooted at the open system call. As further illustrated, the sequences mmap-read-open and mmap-open-read are rooted at the same system call. This combination of sequences reduces the total number of nodes in the forest of trees.

Notwithstanding the savings gained through the reduction in nodes, this conventional storage mechanism still places a significant burden on the intrusion detection system. For example, consider a database that contains 1318 unique system call sequences of length ten. If each of these 1318 unique system call sequences are stored independently, 13180 nodes would be required, wherein each node corresponds to a system call. Storing the 1318 sequences as trees as per an example in the Hofmeyr reference, however, can reduce the number of nodes to 7578 nodes. The storage of the sequences as trees increases the storage efficiency as compared to storage of the 1318 unique system call sequences independently. Notwithstanding the gain in efficiency relative to the independent system call sequence storage, the storage of 7578 nodes still represents a significant storage burden. This inefficiency has a great impact on the ability of the intrusion detection system to operate effectively in real time. Accordingly, what is needed is a mechanism for increasing the operational efficiency of a sequence-based anomaly intrusion detection system.

SUMMARY OF THE INVENTION

The present invention meets the aforementioned needs by providing an intrusion detection system that operates efficiently in real-time. Computational efficiency is generated through the representation of known sequences of system calls in a distance matrix. The distance matrix indirectly specifies known sequences by specifying allowable separation distances between pairs of system calls. The distance matrix is used to determine whether a sequence of system calls in an event window represents an anomaly. Anomalies that are detected are further analyzed through levenshtein distance calculations that also rely on the contents of the distance matrix. In a preferred embodiment, the intrusion detection system is incorporated as part of a system call software wrapper. It is a further feature of the present invention that event abstraction enables the intrusion detection system to apply generically across various computing platforms.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION

A preferred embodiment of the invention is discussed in detail below. While specific implementations are discussed, it should be understood that this is done for illustration purposes only. A person skilled in the relevant art will recognize that other components and configurations may be used without departing from the spirit and scope of the invention.

Intrusion detection systems are principally concerned with the real-time detection and response to intrusions. The viability and ultimate value of an intrusion detection system is measured by its effectiveness in responding during the occurrence of an intrusion. Although post-intrusion analysis provides value in generating profiles of misuse, post-intrusion analysis does little to minimize the impact of an actual intrusion event. Real-time intrusion detection systems are therefore valued based upon their accuracy and efficiency of intrusion detection processing.

Sequence-based intrusion detection systems have been proposed. One such system was described above with reference to the Hofmeyr paper. However, the efficiency of conventional techniques is significantly impacted by the space overheads required to store the database of system call sequences. Moreover, conventional techniques also suffer from their limited portability between platforms.

As will be described in greater detail below, the present invention addresses these concerns by providing a software wrapper that utilizes an efficient storage structure for the representation of known sequences of system calls. These features enable the intrusion detection system of the present invention to operate efficiently in real-time, thereby providing a practical solution to the real-time detection of intrusions.

Software wrapping technology has conventionally been used to provide for the relatively small specification of the allowed behavior of the software application being wrapped. An example of software wrapping technology is disclosed in Fraser et al., "Hardening COTS Software with Generic Software Wrappers," *Proceedings of the 1999 IEEE Symposium on Security and Privacy*, Oakland, Calif. May 1999, which is herein incorporated by reference in its entirety.

In accordance with the present invention, a software wrapper provides a dynamically installable, non-bypassable, operating system extension that intercepts a selected program's system calls. For each system call it intercepts, a wrapper may perform functions such as (1) add functionality (intrusion detection, auditing, encryption) to the system call, (2) transform the system call (e.g. by replacing it with another), or (3) prevent the system call's execution (e.g., perform access control).

Figure 2:
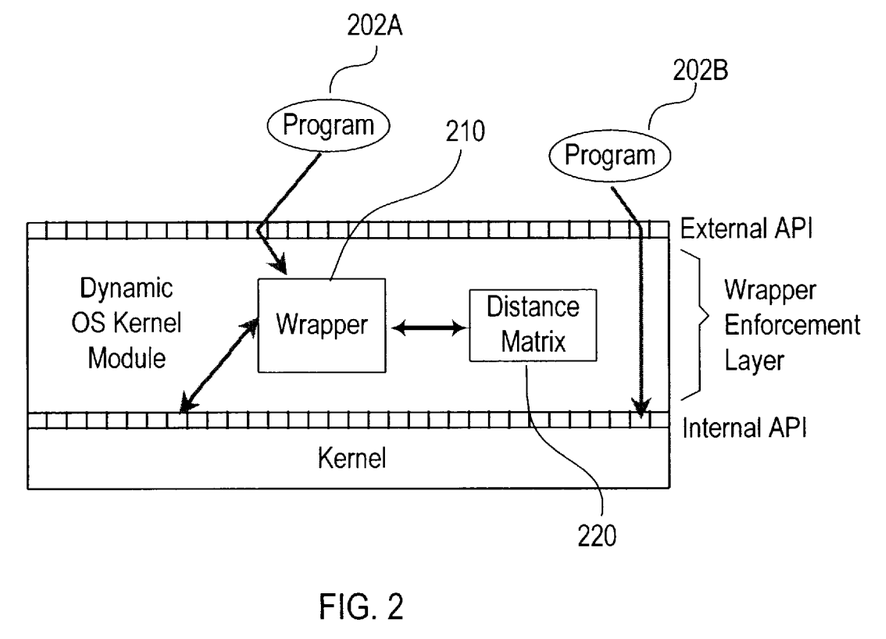
FIG. 2 illustrates an embodiment of a software wrapper.

FIG. 2 illustrates the operation of a software wrapper 210. Although software wrapper 210 is described in the example context of a UNIX environment, the operation of software wrappers as described below can also be extended to other operating system environments (e.g., Windows NT™) as would be apparent.

As illustrated in FIG. 2, operating within the UNIX environment are programs 202A and 202B. Program 202B is an unwrapped program whose system calls pass directly to an internal application programming interface (API). Program 202A, on the other hand, is "wrapped" by software wrapper 210. As illustrated, the kernel-loadable module intercepts all system calls as they are made by a program 202A, and passes the system calls to wrapper 210 based on criteria (i.e., a wrapper specification (WS)) specified when wrapper 210 is loaded. In this framework, wrapper 210 runs in kernel mode and its execution environment is provided in the kernel loadable module. This execution environment is referred to as the wrapper enforcement layer (WEL).

The WEL tracks running processes and evaluates activation criteria at appropriate times to activate new wrapper instances for processes. These wrapper instances wrap their processes by intercepting some or all of the system calls that are made by the process. This interception effectively puts the wrappers in complete control of their processes' interactions with the operating system and with other processes. For each system call, wrappers can observe and/or modify the parameters specified by the caller and the values returned by the operating system.

In general, a system can have many different WSs loaded, with different activation criteria. For example, a WS might apply to all programs run by a specific user, or to all instances of programs run from a particular directory. As illustrated in FIG. 2, because the interception occurs inside the kernel, the wrappers cannot be bypassed by malicious code.

In accordance with the present invention, software wrapper 210 monitors sequences of system calls that are passed to software wrapper 210. Software wrapper 210 enables a form of event abstraction through the use of characterized system call interfaces. Characterized system call interfaces allow software wrapper 210 to be portable between platforms when the APIs of the platforms can be described using the same attributes. In one embodiment, the characterized system call interface consists of the C language prototypes of the functions provided by the actual system call interface augmented with a standard set of tags. These tags map the platform-specific aspects of the function prototype to higher level WDL abstractions that are identical across platforms. For example, a prototype for the open system call from the FreeBSD system call interface is specified as follows:

int open (const char *path, int flags, mode$_{13}$ t mode)

The corresponding system call interface characterization used by the FreeBSD prototype is represented by:

int{fdret, VAL$_{13}$ RET} open {fileop, fdop} (char*path{path,nterm}, int flags, int mode{mode});

The first group of tags consists of those following the function return values. These tags provide the wrapper writer with consistent, named access to return values. For example, since all system calls returning a file descriptor are labeled with ƒdret, the return value for all of them can be accessed in a wrapper as $ƒdret.

The second group of tags consists of those following the function names. These tags divide the functions provided by the system call interface into sets based on the function's behavior. For example, open is marked with the ƒdop tag, identifying it as a function that operates on file descriptors. When wrappers refer to functions in the system call interface by these abstract tags rather than by name, they achieve portability between platforms whose function names may be different.

The third group of tags consists of the tags following the function's formal parameters. Some of these tags divide the parameters into sets based on their purpose in a manner similar to the function name tags described above. For example, the path parameter of the open function is marked with the path tag, identifying it as a parameter representing a path in the file system. Wrappers interested in file system paths can achieve portability by selecting system calls containing the parameter attribute path without naming the system calls directly. They can access the path parameter in system calls without concern for the location of the path in the parameter list, simply by using the $path variable.

In general, event abstraction allows the wrapper writer to specify the events to be intercepted in a very generic way. This allows the algorithm to function on any system that supports generic software wrappers.

In a preferred embodiment, event abstraction through generic software wrappers is used to implement a multi-platform sequence-based anomaly detection wrapper. As noted, sequence-based anomaly detection is based upon the calculation of an anomaly value for a program's execution of an event sequence relative to a pre-computed database of event sequences.

The intrusion detection system therefore runs in two modes: record mode and detect mode. In record mode, the intrusion detection system generates a normative sequence database for each program executed. A per-program database for every program executed is thereby created.

Figure 3:
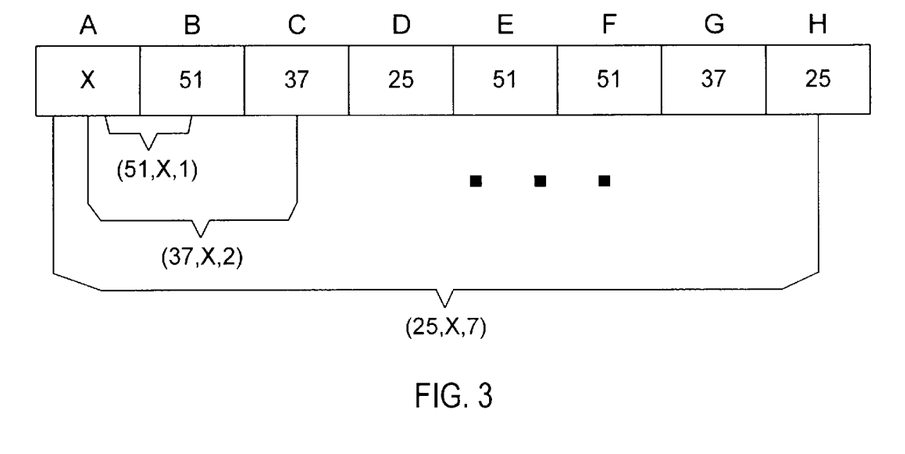
FIG. 3 illustrates a system call event window.
Figure 4:
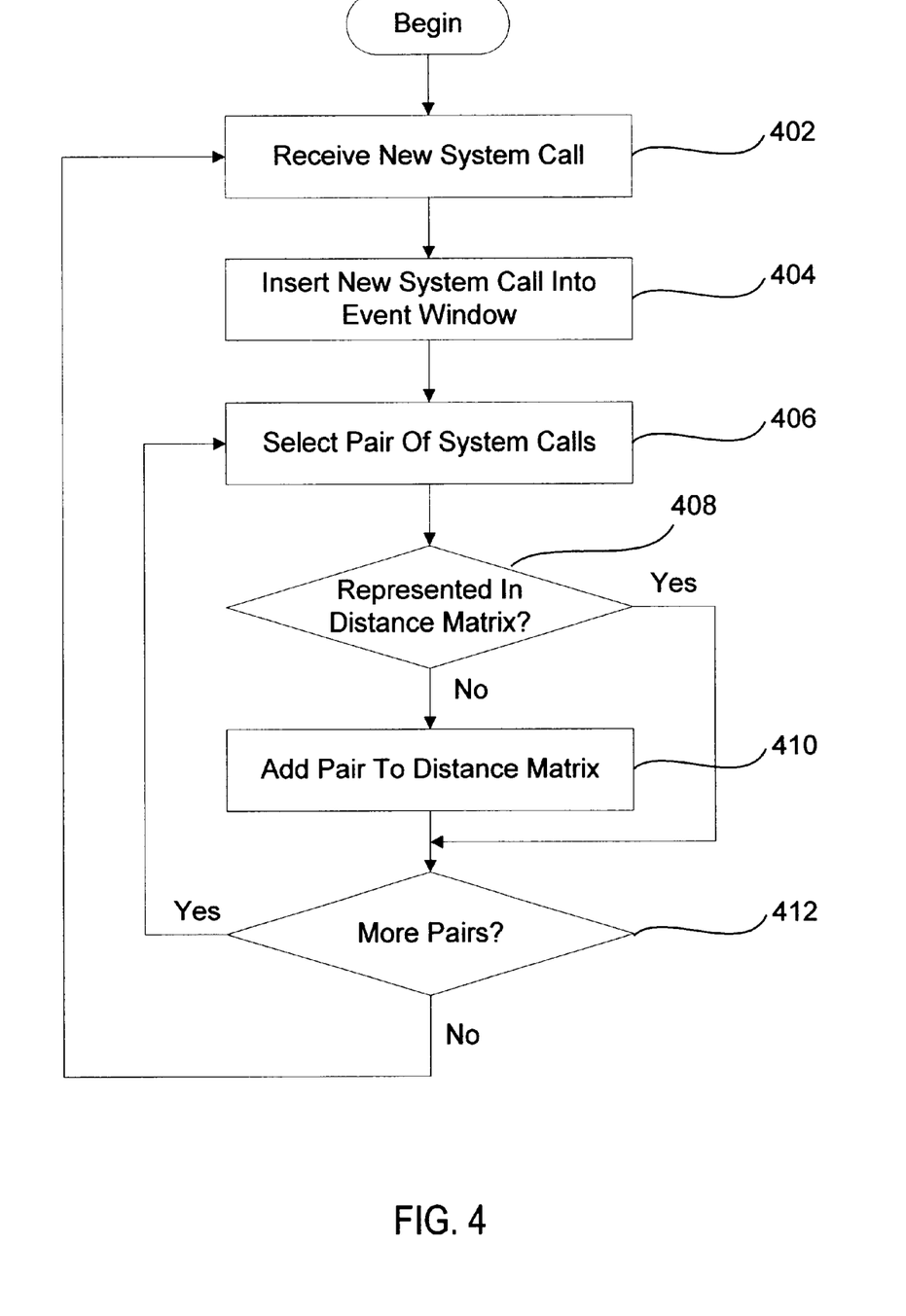
FIG. 4 illustrates a flowchart of a system call sequence record mode process.

FIG. 4 illustrates a flowchart of the record mode process. In a preferred embodiment, this record mode process is operative on system call events that have been abstracted into a generic event format as described above. Prior to describing the record mode process, a description of the system call event window is provided. An example of a system call event window is illustrated in FIG. 3.

System call event window 300 represents a sequence of system call events that are moving through system call event window 300 from left to right. System call event window 300 is fixed in size and can be arbitrarily set to a width of N events. In a preferred embodiment, system call event window 300 contains eight events at locations designated as positions A–H.

As illustrated in FIG. 3, event window 300 includes events x, 51, 37, 25, 51, 51, 37, and 25, at positions A–H, respectively. The oldest event in system call event window 300 is the event at position H, while the newest event in system call event window 300 is the event at position A. When a new event enters event window 300 at position A, the oldest event is removed from position H, thereby exiting event window 300.

For illustration purposes, the events in event window 300 have been chosen to correspond with the trace (oldest to newest) of system calls open-read-mmap-mmap-open-read-mmap, as discussed above. This correspondence can be seen when considering the assignment of a numerical identifier to each of the system calls. In the present example open is assigned the identifier 25, read is assigned the identifier 37, and mmap is assigned the identifier 51. The identifier x is used to represent the newest system call that has entered into event window 300.

In conventional systems, the trace of system calls open-read-mmap-mmap-open-read-mmap would be stored as part of a tree structure that is rooted at the system call open. This storage mechanism places a significant burden on the intrusion detection system.

In the present invention, a distance matrix (illustrated as reference number 220 in FIG. 2) is used to represent the various observed event sequences. Distance matrix 220 includes information on pairs of events by storing the known distances that a first system call follows a second system call. For a program that includes M possible system calls, and an event window 300 having a width of N events, distance matrix 220 can be represented by a M×M×N data array structure. For example, in a 256×256×8 data structure, the value of data element (25, 37, 1) would signal whether system call 37 has been known to follow system call 25 at a distance of one (i.e., immediately following).

The content of the M×M×N data array structure can be used to represent all possible system call event pairs that can appear in event window 300. It should be noted that the collection of system call event pairs indirectly define the various known system call sequences. This is in contrast to conventional tree-structured storage mechanisms that explicitly define the individual system call sequences.

For example, consider the system call sequences open-read-mmap and read-mmap-mmap. A conventional storage structure stores two explicit trees as in FIG. 1. In a distance matrix representation, on the other hand, each separate system call event pair is recorded. For the open-read-mmap (25-37-51) sequence, the existence of the (open, read) pair would cause element (25, 37, 1) to be set to true, the existence of the (read, mmap) pair would cause element (37, 51, 1) to be set to true, and the existence of the (open, mmap) pair would cause element (25, 51, 2) to be set to true. Similarly, for the read-mmap$_1$-mmap$_2$ (37-51-51) sequence, the existence of the (read, mmap$_1$) pair would cause element (37, 51, 1) to be set to true, the existence of the (mmap$_1$, mmap$_2$) pair would cause element (51, 51, 1) to be set to true, and the existence of the second (read, mmap$_2$) pair would cause element (37, 51, 2) to be set to true.

Significantly, it should be noted that the both the open-read-mmap and read-mmap-mmap sequences include the same (read, mmap) pair that corresponds to element (37, 51, 1). This common system call pair would not require duplication in memory. This is true regardless of where the pair appeared in the system call sequence. In conventional systems, on the other hand, two system call sequences can only be combined if a common root existed. Redundancy in the system call sequence database therefore results. Thus, the indirect representation of system call sequences can save a significant amount of memory that otherwise would have been used to store the collection of system call trees. As will be described in greater detail below, the fixed-size distance matrix also enables the creation of an efficient intrusion detection process.

The creation of distance matrix 220 is now described with reference to the flowchart of FIG. 4. Flowchart 400 illustrates the steps that are performed in adding system call sequence data to the distance matrix 220. The process begins at step 402 when a new system call is received. As noted, a system call that is generated by a program is intercepted by a kernel-loadable module and is subsequently passed to a software wrapper. At step 404, the software wrapper inserts the new system call into event window 300. In this process, the remaining system calls in event window 300 are each shifted one position, with the oldest system call being dropped out of event window 300.

FIG. 3 illustrates an example snapshot of event window 300 when a new system call X enters event window 300. As illustrated, system call X is located in position A of event window 300. After the new system call X has been placed into event window 300, the sequence of system calls defined by event window 300 can be recorded.

Sequences of system calls are not explicitly recorded. Rather, sequences of system calls are implicitly defined by a distance matrix that records known distances between pairs of system calls. This distance information is generated upon the entry of a new system call into event window 300.

More specifically, at step 406, a first pair of system calls is selected. As illustrated in FIG. 3, the first pair of system calls is represented by new system call X and the immediately previously received system call 51. At step 408, the system then determines whether this system call pair relationship (i.e., whether system call X can follow system call 51 at a distance of one) is represented in distance matrix 220. More specifically, the system determines whether distance matrix element (51, X, 1) is set to true. If distance matrix element (51, X, 1) is not set to true, then the system call pair relationship has not been previously seen. Distance matrix element (51, X, 1) is therefore set to true, at step 410, to record the system call pair relationship as a known system call pair sequence. The process then proceeds to step 412 where it is determined whether more pairs need to be processed.

If distance matrix element (51, X, 1) is determined, at step 408, to be set to true, then the system call pair relationship has been previously seen. The process then proceeds directly to step 412 where it is determined whether more pairs need to be processed.

If, at step 412, it is determined that there are additional system call pairs to process, then the process returns to step 406 where the next system call pair is selected. If, however, it is determined that there are no additional system call pairs to process, then the process returns to step 402 where a new system call event is received.

In an event window 300 that contains eight system calls, there are seven pairs of system calls that must be processed, i.e., system call pairs at positions (A, B), (A, C), (A, D), (A, E), (A, F), (A, G), and (A, H). As illustrated in FIG. 3, the next system call pair (A, C) includes new system call X and system call 37. Distance matrix element (37, X, 2) is therefore examined at step 408. The selection of system call pairs continues until the system calls on both ends of event window 300 are examined. The final system call pair includes new system call X and system call 25. In this system call pair, new system call X follows system call 25 at a distance of seven. Distance matrix element (25, X, 7) would therefore be examined at step 408. As would be appreciated, the sequence of examining system call pairs can be performed in any order.

In a preferred embodiment, distance matrix 220 is stored as an array of bit vectors. For example, consider a program that can potentially call 256 system calls. If event window 300 is fixed at a length of eight events, then distance matrix 220 is represented by a 256×256 array of 8-bit vectors. These eight-bit vectors are hard coded in the record process. For example, when it is desired to set distance matrix element (25, X, 7) to true, the record process can set the seventh bit of the (25, X) bit vector to one.

It is a feature of the present invention that distance matrix 220 is a fixed-size data structure. In the above example, the 256×256 array of 8-bit vectors would occupy 64 kbytes of memory. This amount of memory is sufficient to store information for all possible sequences of system calls that are observed in the record mode process.

Figure 5:
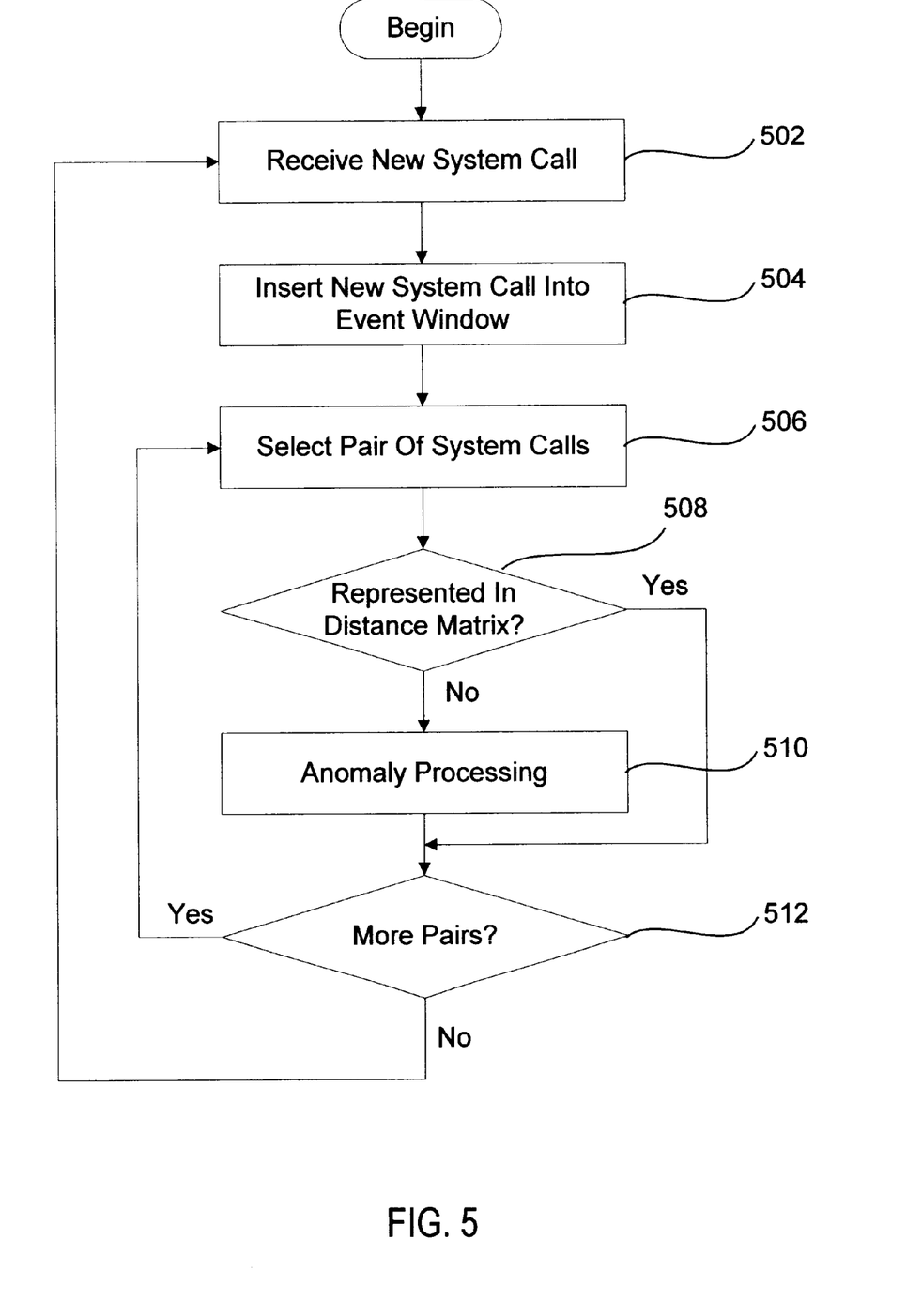
FIG. 5 illustrates a flowchart of a system call sequence detect mode process.

After the record process has finished generating distance matrix 220 for a program, distance matrix 220 can then be used to detect anomalies in the operation of the program. The operation of the intrusion detection process is illustrated in the flowchart of FIG. 5. The operation of the detection process is similar to the recording process. Instead of storing information into the distance matrix, the intrusion detection system simply reads information from distance matrix 220.

The detection process begins at step 502 when a new system call is received. At step 504, the new system call is inserted into event window 300. In this process, the remaining system calls in event window 300 are each shifted one position, with the oldest system call being dropped out of event window 300.

At this point, the system determines whether the new sequence of system calls in event window 300 is a recognized sequence. In accordance with the present invention, the determination process is not based upon a literal comparison of entire sequences of system calls. Rather, multiple pairs of system calls are compared relative to the predefined contents of distance matrix 220.

More specifically, at step 506, a first pair of system calls is selected. As illustrated in FIG. 3, the first pair of system calls is represented by new system call X at position A and the previously received system call 51 at position B. At step 508, the software wrapper then determines whether this system call pair relationship is represented in distance matrix 220. More specifically, the system determines whether distance matrix element (51, X, 1) is set to true. If distance matrix element (51, X, 1) is determined, at step 408, to be set to true, then the system call pair relationship has been previously seen. The process then proceeds directly to step 512 where it is determined whether more system call pairs need to be processed.

In an event window 300 that contains eight system calls, there are seven pairs of system calls that must be processed, i.e., system call pairs at positions (A, B), (A, C), (A, D), (A, E), (A, F), (A, G), and (A, H). It should be noted that system call pairs at positions such as (B, C), (B, D), (B, E), etc., need not be processed because those system call pairs were previously processed when system call 51 at position B first entered event window 300 at position A. System call pairs (A, B), (A, C), (A, D), (A, E), (A, F), (A, G), and (A, H) are sequentially examined in the loop of steps 506–512 to determine whether the entry of system call X into event window 300 creates a new sequence of system calls. If each system call pair has been determined to exist in distance matrix 220, then the sequence of system calls that resides in event window 300 represents a known sequence of system calls. The process then loops back to step 502 where the next system call is received.

If, at step 508, one of the system call pairs has been determined not to exist in distance matrix 220, then the system call sequence in event window 300 has not been seen before. In this case, the detect process proceeds to step 510, where anomaly analysis processing is performed. In the anomaly analysis processing step, the magnitude of the anomaly is identified. This magnitude measure represents the extent to which the system call sequence in event window 300 differs from sequences that are represented by the data in distance matrix 220. In general, a small variation would indicate a lower likelihood of intrusion while a large variation would indicate a significant likelihood of intrusion.

In a preferred embodiment of the present invention, a levenshtein distance is used as a measure of the magnitude of the difference between a system call sequence in a stored profile and the system call sequence that is generated by a program. Unlike hamming distances, Levenshtein distances provide a smoother, more graduated distance metric. Consider an example comparison of the strings "zabc" and "abcd." In this example, the hamming distance calculation would yield a value of four because the two strings differ at each of the four character positions (see Table 1).

TABLE 1

| 1 | 2 | 3 | 4 |
|---|---|---|---|
| z | a | b | c |
| a | b | c | d |

The levenshtein distance, on the other hand, would yield a value of two. The levenshtein distance calculation counts the differences between two strings, where differences are counted not only when strings have different characters, but also when one string has a character whereas the other string does not. In this manner, the levenshtein distance is defined for strings of arbitrary length. To illustrate this concept, consider the Levenshtein distance calculations illustrated in Table 2.

TABLE 2

| 1 | 2 | 3 | 4 | 5 |
|---|---|---|---|---|
| z | a | b | c | — |
| — | a | b | c | d |

In this example, the two strings are effectively shifted relative to each other, thereby producing the minimum amount of difference between the two strings. As illustrated in Table 2, the levenshtein distance is equal to two based upon the mismatches that occur at character position one and character position five.

The levenshtein distance calculation can be defined for two arbitrary length strings s and t of length n and m, respectively. In the levenshtein distance calculation, an (n+1)×(m+1) array, d, is filled with integers in accordance with recursive equation (1) below:

$$d(i, j) = \min(d(i-1, j)+1, d(i, j-1)+1, d(i-1, j-1)+r(s(i), t(j))),$$
where
$$r(a, b)=0 \text{ if } a=b; r(a, b)=1 \text{ otherwise} \quad (1)$$

Figure 6:
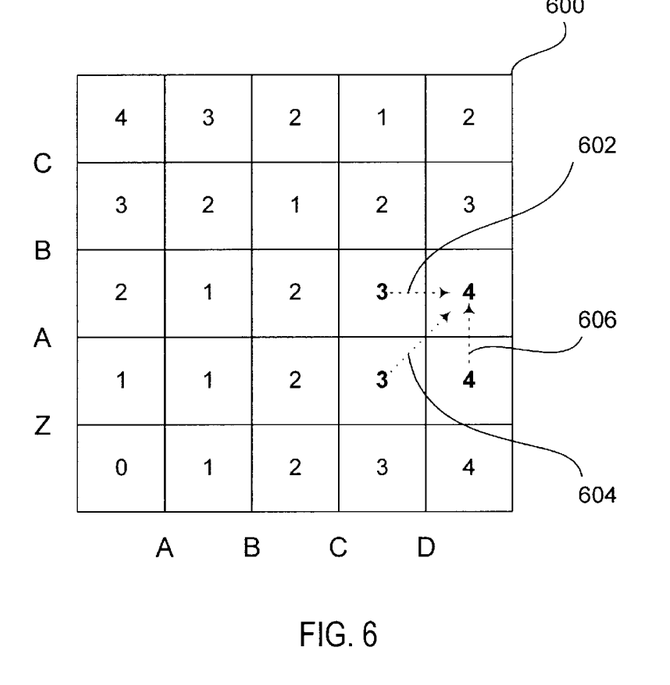
FIG. 6 illustrates an example of a levenshtein distance matrix.

The recursive calculation is now described with reference to levenshtein matrix 600 of FIG. 6. In the example of FIG. 6, the levenshtein distance for the strings s="abcd" and t="zabc" is calculated using a 5×5 array 600. Prior to beginning the recursive calculation, array 600 is initialized by setting the first row d(i, 0)=i, i=0 to 4, and the first column d(0, j)=j, j=0 to 4. Once array 600 is initialized, the recursive calculation can be performed by filling in the columns from left to right, and by filling the rows from bottom to top, beginning with array 600 element (1, 1). To illustrate this recursive calculation, consider the calculation of array element (4, 2). The value of array element (4, 2) is based upon array elements (3, 2), (4, 1), and (3, 1). In accordance with equation (1), the value of d(4, 2)=min ((3, 2)+1, (4, 1)+1, (3, 1)+r(s(4), t(2)))=min (4, 5, 3+r("d", "a"))=min (4, 5, 4)=4. Array element (4, 2) is therefore assigned the value of 4. This recursive calculation process continues until array element (5, 5) is reached. The value of array element (5, 5) represents the result of the levenshtein distance calculation for the strings "abcd" and "zabc."

The process described above identifies the general framework for calculating a levenshtein distance. Typically, this process is applied to the comparison of explicitly defined strings. In the present invention, however, profiles of previously encountered strings are indirectly defined using distance matrix 220. The incorporation of distance matrix 220 as part of the levenshtein distance calculation process can be effected through the example section of code shown below.

```
for (i=1; i < (DEPTH+1) ; ++i) {
    for (j=1; j < (DEPTH+1) ; ++j) {
        int dNW = ln__matrix[i-1] [j-1];
        int dW = ln__matrix[i] [j-1] + 1;
        int dN = ln__matrix[i-1] [j] + 1;
        unsigned char nwc = (*db) [test__head] [sequence[i-1]];
        unsigned char mask = 1<<(j-1);
        dNW += (nwc & mask) ? 0 : 1;
        ln__matrix[i] [j] = MIN (dNW,MIN(dW,dN));
    }
}
```

In this excerpt of code, it is assumed that event window 300 is eight events wide. Each of the events in event window 300 is referenced using the sequence array. Distance matrix 220 is referenced using the (*db) [syscall 1] [syscall 2] array, which accesses hard-coded 8-bit vectors. The hard-coded 8-bit vectors identify the known distances at which syscall 2 can follow syscall 1.

The loop of instructions at lines 3–9 is operative to determine the value of the levenshtein array element (i, j). Lines 3–5 assign values to the recursively-defined variables dNW, dW, and dN. These three variables are used to calculate the recursions represented by arrows 504, 506, and 502, respectively. The variable dNW is further determined based upon lines 6–8. At line 6, the hard-coded 8-bit vector (*db) [test__head] [sequence[i-1]] is assigned to the variable nwc. Here, test__head refers to the system call being tested as the root of a test sequence to which the sequence in event window 300 is compared, while sequence[i-1] refers to the particular system call in event window 300.

At line 7, a bit in the 8-bit vector mask is shifted j−1 times. This bit shifting reflects the event in the test sequence that is being examined. With reference to FIG. 6, the bit shifting would reflect the particular column element that is currently being calculated. As noted above, the sequence of array element calculations would proceed from left to right through the columns and bottom to top through the rows.

Next, at line 8, the hard-coded 8-bit vector at (*db) [test__head] [sequence[i-1]] is examined relative to the mask 8-bit vector to determine whether a match exists. If a match exists, then the sequence[i−1] system call has been known to follow the [test_head] system call by [j−1] positions. This comparison will dictate whether the variable r(a, b) in equation (1) above should be equal to one or zero. If the sequence[i−1] system call has been known to follow the [test_head] system call by [j−1] positions then the dNW variable is not incremented. If the sequence[i−1] system call has not been known to follow the [test_head] system call by [j−1] positions then the dNW variable is incremented by one.

Finally, at line 9, the minimum of the variables dNW, dW, and dN is written into the levenshtein matrix ln_matrix. After the levenshtein matrix ln_matrix has been filled, the value of ln_matrix [DEPTH] [DEPTH] is read out as the levenshtein distance value for a sequence beginning with the system call test_head. This process is repeated for all possible values of test_head (i.e., all possible values of system calls that can be used by the program). The minimum value across all possible values of test_head therefore represents the minimum levenshtein distance across all known sequences of system calls. Based upon the value of the minimum levenstein distance, the intrusion detection system can then determine whether an intrusion alert, or other forms of intrusion detection processing, should be initiated. For example, if the minimum levenstein distance is greater than a predefined threshold, the intrusion detection system can initiate steps to terminate the abnormal process.

As thus described, an efficient intrusion detection system capable of operating in real-time is provided. Computational efficiency is enabled through the representation of known sequences of system calls (or events) in a distance matrix. The distance matrix indirectly specifies known sequences by specifying allowable separation distances between pairs of system calls. The distance matrix can be used for both anomaly detection processing and anomaly magnitude determination processing using levenshtein distance calculations. It is a further feature of the present invention that the implementation of the intrusion detection process within a software wrapper having event abstraction enables the intrusion detection system to apply generically across various computing platforms.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for detecting anomalies in a stream of events, the method comprising:

(a) deploying a detection module upon an invocation of an application on a computer system;

(b) abstracting a stream of events into a generic event format; and (c) synchronously determining, using said detection module, whether said stream of generic events includes an anomalous sequence of events;

wherein (a) comprises activating a system call wrapper in kernel space and associating said system call wrapper with said application.

2. The method of claim 1, wherein (b) comprises characterizing a system call interface such that application programming interfaces can be described by multiple platforms using the same attributes.

3. The method of claim 1, further comprising defining a fixed-size distance matrix that specifies known separations between pairs of events.

4. The method of claim 3, wherein said fixed-size distance matrix is implemented as a M×M×N data structure, wherein M is the number of possible events, and N is the number of events in an event window.

5. The method of claim 3, wherein (c) comprises analyzing a set of N events.

6. The method of claim 5, wherein (c) comprises comparing the separation of a new event with each of the previous N−1 events with the contents of said fixed-size distance matrix.

7. A system for detecting anomalies in a stream of events in a computer system, comprising:

an event abstraction module that translates a stream of events into a generic event language format;

a detection module that synchronously determines whether said stream of generic events includes an anomalous sequence of events; and a management module that dynamically deploys a detection module upon an invocation of an application on a computer system;

wherein said management module is operative to activate a system call wrapper in kernel space and associate said system call wrapper with said application.

8. The system of claim 7, wherein said event abstraction module characterizes a system call interface such that application programming interfaces can be described by multiple platforms using the same attributes.

9. The system of claim 7, further comprising a fixed-size distance matrix that specifies known separations between pairs of events.

10. The system of claim 9, wherein said fixed-size distance matrix is implemented as a M×M×N data structure, wherein M is the number of possible events, and N is the number of events in an event window.

11. The system of claim 9, wherein said detection module is operative to analyze a set of N events.

12. The system of claim 11, wherein said detection module compares the separation of a new event with each of the previous N−1 events with the contents of said fixed-size distance matrix.

* * * * *